(12) United States Patent
Watanabe et al.

(10) Patent No.: US 7,379,710 B2
(45) Date of Patent: May 27, 2008

(54) RADIO-WAVE PROPAGATIONCHARACTERISTIC FORECASTING SYSTEM AND ITS METHOD, AND PROGRAM

(75) Inventors: Yoshinori Watanabe, Tokyo (JP); Hiroshi Furukawa, Tokyo (JP)

(73) Assignee: NEC Corporation, Tokyo (JP)

( * ) Notice: Subject to any disclaimer, the term of this patent is extended or adjusted under 35 U.S.C. 154(b) by 780 days.

(21) Appl. No.: 10/806,394

(22) Filed: Mar. 23, 2004

(65) Prior Publication Data

US 2005/0088165 A1  Apr. 28, 2005

(30) Foreign Application Priority Data

Mar. 26, 2003  (JP)  ............................. 2003-084038

(51) Int. Cl.
*H04B 17/00*  (2006.01)
*G01S 13/08*  (2006.01)
(52) U.S. Cl. ..................... 455/67.11; 455/106; 342/118
(58) Field of Classification Search ............. 455/67.11, 455/106, 456, 457; 342/118, 139, 140, 143, 342/5

See application file for complete search history.

(56) References Cited

FOREIGN PATENT DOCUMENTS

JP  9-33584  2/1997

OTHER PUBLICATIONS

Proceedings of the IEEE, vol. 62, No. 11, Nov. 1974, "A Uniform Geometrical Theory of Diffraction for an Edge in a Perfectly Conducting Surface".

*Primary Examiner*—Matthew Anderson
*Assistant Examiner*—Eugene Yun
(74) *Attorney, Agent, or Firm*—Young & Thompson

(57) ABSTRACT

An object of the invention is to obtain a high-speed and high-accuracy radio-wave propagation characteristic forecasting system in combination with the launching method by correctly estimating a diffraction phenomenon when a ray passes the vicinity of an edge of a structure. To estimate a radio-wave propagation characteristic in accordance with the ray launching method, when a ray passes the vicinity of an edge of a structure, a diffracted wave is generated at the edge if the distance between the edge and the ray is smaller than the radius of a ray spread. Thereby, it is easy to combine the ray launching method with the conventional ray launching method and it is possible to estimate a high-speed high-accuracy radio-wave propagation characteristic also considering a ray diffracted wave.

13 Claims, 19 Drawing Sheets

PRIOR ART

PRIOR ART

PRIOR ART

PRIOR ART

PRIOR ART

RADIO-WAVE PROPAGATION CHARACTERISTIC FORECASTING SYSTEM AND ITS METHOD, AND PROGRAM

BACKGROUND OF THE INVENTION

1. Field of the Invention

The present invention relates to a radio-wave propagation characteristic forecasting system and its method, particularly to a radio-wave propagation characteristic forecasting method using a geometric-optical method using the so-called ray launching.

2. Description of the Prior Art

A radio-wave propagation simulator is used to support the arrangement of base stations or host systems in a wireless communication system. Reception power and delay spread are evaluated at an optional reception point by a radio-wave propagation simulator to decide a setting place of an appropriate transmitting station and as a result, the reduction of the number of base stations to be arranged is efficiently executed.

The radio-wave propagation simulation is roughly divided into the simulation using a statistical method and the simulation using a deterministic method. The statistical method is a method for deciding a parameter of an estimate equation using a distance or frequency as an argument through the multivariate analysis in accordance with a lot of data obtained from actual measurement of a propagation loss. The deterministic method is a method for obtaining a propagation loss or delay value by assuming radio waves radiated from an antenna as an aggregate of radio-wave rays and synthesizing rays geometrically-optically propagating while repeating reflection and transmission and reaching an observation point.

The geometric-optical method is further divided into the imaging method and the ray launching method. The imaging method is a method for deciding a ray reflection/transmission route connecting a transmission point with a reception point by obtaining a imaging point against a reflection surface. A reflection/transmission route can be uniquely obtained when a transmission point, reception point, and reflection/transmission object are defined. Therefore, the imaging method is a strict method for searching a ray propagation route. However, the ray launching method is a method for regarding a ray passing the vicinity of a reception point as a ray reaching the reception point by radiating rays from an antenna in a certain direction independently of a reception point and obtaining a ray propagation route according to reflection and transmission, which is disclosed in Japanese Patent Laid-Open No. 9-33584.

FIG. 15 is an illustration for explaining operations of the ray launching method when an observation region 100, transmission point A18, reception point A20, and two objects A06 and A09 are provided. In FIG. 15, operations are explained by restricting the operations to a two-dimensional plane for simplification. In fact, however, operations may be performed in a three-dimensional space.

First, a ray A03 is radiated from the transmission point A18 in the direction of a certain propagation route. It is examined for all objects in the observation region whether the ray radiated in the direction collides with the objects present in the observation region 100. The ray A03 collides with the object A06 at a reflection point A19 and as a result, a transmitting ray A07 and a reflected ray A11 are generated. The ray 11 generated due to reflection further collides with the object A09, so that a transmitting ray A15 and a reflected ray A10 are generated. The reflected ray A10 passes the vicinity of the reception point A20, the ray is handled as an incoming wave at an observation point.

Specifically, the reception intensity and the incoming delay time defined in accordance with the total of propagation distances of the rays A03, A11, and A10 are recorded as shown in FIG. 16. The abscissa axis 101 of FIG. 16 shows the delay time required for the rays to achieve the total of the above propagation distances from the transmission point A18 up to the observation point A20 and the ordinate axis 102 shows reception intensities of the rays passing through the route of the total of the propagation distances.

The reflection/transmission ray search same as the case of the above propagation route is repeated for the ray A03 radiated in the direction of the propagation route from the transmission point A18 also on transmitted waves A07 to A15. When a ray passes the vicinity of the reception point A20, it is handled as a coming wave the same as the case of the ray A10 and the above processing is continued until a search end condition is satisfied. The search end condition is set to a condition when the reception electric-field intensity at a reflection/transmission point becomes lower than a predetermined value.

After the reflection/transmission route search of a ray radiated in the direction of the ray A03 from the transmission point A18 is completed, the same launching is executed by changing emission angles of the ray to be radiated from the transmission point A18 like the case of, for example, the ray A21 in another propagation route and examined on all emission directions of the transmission point A18 or some of emission directions previously defined. Finally, FIG. 17 is obtained which is a delay profile for the reception point A20. The abscissa axis 201 of FIG. 17 shows the delay time until a ray comes from the transmission point A18 and the ordinate axis 202 shows the reception intensity of a ray passing through the route. Reception power is obtained by the sum of reception intensities of all paths and a delay spread showing the degree of a distortion is given by the standard deviation of delay times.

The above ray launching method is not a method for strictly obtaining the solution of the propagation route of a ray connecting a transmission point with a reception point like the imaging method but it is a method for approximately providing the solution. Therefore, it has a feature capable of shortening the time required for propagation route search.

A ray spread corresponding to the propagation distance from the transmission point is defined for each ray shown in FIG. 15. The ray spread is a spread region defined in the vicinity of a ray and the spread is defined so that it increases as the distance from the transmission point increases and decreases as the number of rays radiated from the transmission point increases.

In FIG. 18, the same portion as that in FIG. 15 is shown by the same symbol. FIG. 18 specifically shows the envelope of a ray spread, in which the ray spread envelope for the ray A03 is defined by A01 and A02, that for the ray A11 is defined by A12 and A16, and that for the ray A10 is defined by A22 and A23. This ray spread is used to decide whether to regard a ray passing the vicinity of the reception point A20 as a ray reaching the reception point.

Specifically, when the reception point A20 is given, the distance D between the point A20 and the ray A10 is compared with the spread radius S of the ray spread at the spot concerned. When S is equal to or larger than D, the ray is handled as an arrival ray at the observation, and the delay time and reception intensity at the reception point A20 are recorded by considering the propagation distance from a transmission point, reflection number, distance D, and etc.

The delay profile characteristic at the reception point is obtained by applying the above described operation to all rays radiated from the transmission point A18, recording delay times and reception intensities of arrival rays incorporated into the reception point one by one, and synthesizing the delay times and reception intensities.

Main geometric-optical components in radio wave propagation are a reflected wave and a transmitted wave. However, to more accurately estimate a radio-wave propagation characteristic, it is necessary to consider a diffracted wave which is a nongeometric-optical component. In this case, diffraction is defined as a phenomenon that when a ray collides with an edge of a structure, a radio wave propagates while curving in a direction other than the traveling direction of the ray. Though a diffracted wave is originally not a geometric-optical component, the UTD method (Uniform Theory of Diffraction) described in ("A uniform geometrical theory of diffraction for an edge in a perfectly conducting surface," Proc. IEEE, vol. 62, pp. 1448-1461, 1974) is generally used as a method for handling a diffraction phenomenon in a geometric-optical range. The UTD method models a diffractive wave by generating a plurality of rays having a radiation angle equal to the incident angle to a diffraction edge around the diffraction edge.

FIG. 19 is a schematic view for specifically explaining the UTD method. A case is assumed in which a ray R001 radiated from a transmission point S001 enters a diffraction edge E002 of a structure (object) E001. In the case of the UTD method, the diffraction edge R002 is radiated from a diffraction point D001 so that the angle Ti formed between the diffraction edge E002 and the incident ray R001 becomes equal to the angle To formed between the diffraction edge E002 and a diffracted ray R002. In FIG. 19, only one diffracted ray is shown. However, innumerable diffracted rays satisfying the above condition are generated along the side face of a cone C001 set to the outside of the structure E001.

In the ray launching method, the route tracing of a ray is performed by radiating rays from a transmission point at predetermined intervals and detecting the collision between the rays and a structure. However, because a ray is a line defined in a three-dimensional space having an infinitesimal size, the possibility that the ray collides with an edge of the structure provided as a line is also very low. Therefore, there is a problem that a diffraction phenomenon cannot correctly be estimated because diffracted waves are hardly generated only by simply applying the conventional UTD method to the ray launching method.

BRIEF SUMMARY OF THE INVENTION

It is an object of the present invention to provide a high-speed and high-accuracy radio-wave propagation characteristic forecasting system and its method and a program by correctly estimating a diffraction phenomenon and combining the phenomenon with the launching method when a ray passes the vicinity of an edge of a structure.

A radio-wave propagation characteristic forecasting system of the present invention is a radio-wave propagation characteristic forecasting system for performing ray launching for obtaining a passage time and an intensity when a structure having an edge, a transmission point, and a reception point are provided in an observation space defined in a three-dimensional space, a plurality of radio-wave rays is radiated from the transmission point at different angles, and the rays repeat reflection and transmission due to collision with the structure caused by their progress and pass the vicinity of the reception point while repeating the reflection and transmission, which comprises ray spread defining means for defining a ray spread provided as a function of propagation distances from the transmission point to the rays, distance calculating means for calculating the distance between each of the rays and the edge, radius calculating means for obtaining a point on each of the rays and a point on the edge for determining the distance and calculating a ray spread radius to the distance from the point on each of the rays up to the transmission point, and diffracted-ray generating means for generating a plurality of diffracted rays by using the point on the edge as a diffraction point when the ray spread radius is equal to or larger than the distance between each of the rays and the edge.

A radio-wave propagation characteristic forecasting method of the present invention is a radio-wave propagation characteristic forecasting method for performing ray launching for obtaining a passage time and an intensity when a structure having an edge, a transmission point, and a reception point are provided in an observation space defined in a three-dimensional space, a plurality of radio-wave rays is radiated from the transmission point at different angles, and the rays repeat reflection and transmission due to collision with the structure caused by their progress and pass the vicinity of the reception point while repeating the reflection and transmission, which comprises a ray spread defining step of defining a ray spread provided as a function of propagation distances from the transmission point to the rays, a distance calculating step of calculating the distance between each of the rays and the edge, a radius calculating step of obtaining a point on each of the rays and a point on the edge for determining the distance and calculating a ray spread radius to the distance from the point on each of the rays up to the transmission point, and a diffracted-ray generating step of generating a plurality of diffracted rays by using the point on the edge as a diffraction point when the ray spread radius is equal to or larger than the distance between each of the rays and the edge.

A program of the present invention is a program for making a computer execute a radio-wave propagation characteristic forecasting method for performing ray launching for obtaining a passage time and an intensity when a structure having an edge, a transmission point, and a reception point are provided in an observation space defined in a three-dimensional space, a plurality of radio-wave rays is radiated from the transmission point at different angles, and the rays repeat reflection and transmission due to collision with the structure caused by their progress and pass the vicinity of the reception point while repeating the reflection and transmission, which comprises a ray spread defining step of defining a ray spread provided as a function of propagation distances from the transmission point to the rays, a distance calculating step of calculating the distance between each of the rays and the edge, a radius calculating step of obtaining a point on each of the rays and a point on the edge for determining the distance and calculating a ray spread radius to the distance from the point on each of the rays up to the transmission point, and a diffracted-ray generating step of generating a plurality of diffracted rays by using the point on the edge as a diffraction point when the ray spread radius is equal to or larger than the distance between each of the rays and the edge.

Functions of the present invention are described below. In the case of the ray launching method, a ray spread decided correspondingly to the radiation interval at a transmission point and the propagation distance from the transmission point is defined in each ray. However, the present invention makes the combination with the conventional launching method easy and realizes a high-speed and high-accuracy radio-wave propagation characteristic forecasting system by generating a diffracted wave with an edge when the distance between the edge and a ray is smaller than a ray spread radius even if the ray does not directly collide with the edge when the edge passes the vicinity of the edge.

DETAILED DESCRIPTION OF THE PREFERRED EMBODIMENTS

Figure 1:
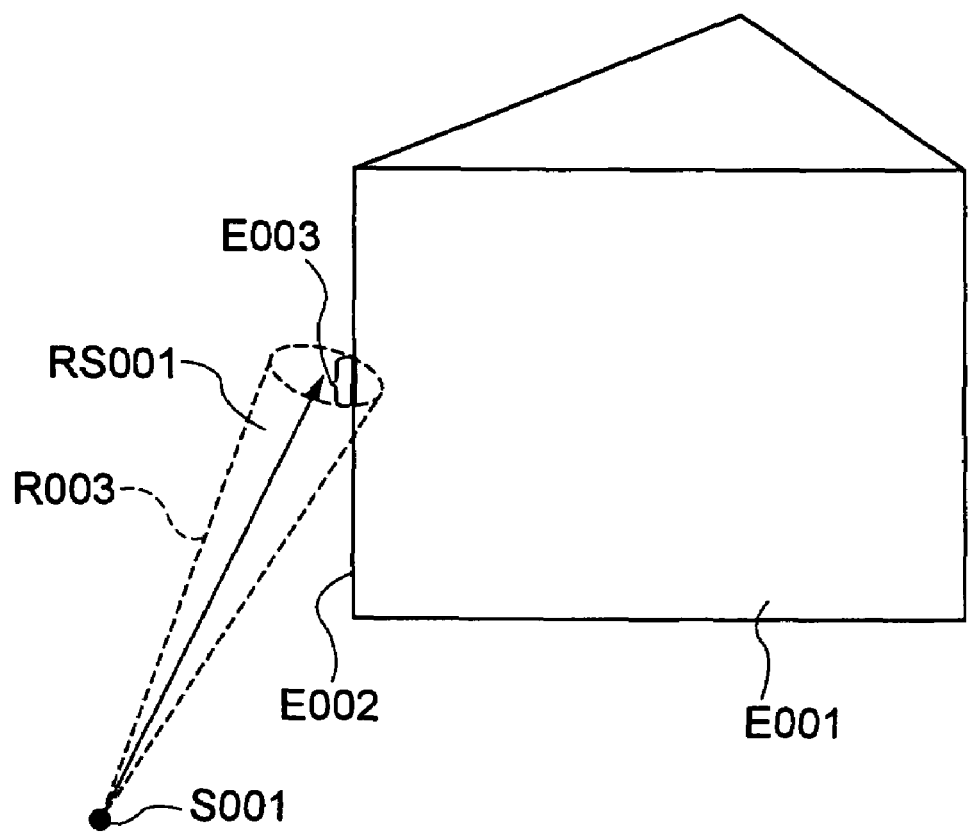
FIG. 1 is an illustration for explaining a generation state of a diffracted ray in an embodiment of the present invention.

Embodiments of the present invention are described below in detail by referring to the accompanying drawings. FIG. 1 is an illustration showing a state when a diffracted ray is generated in an embodiment of the present invention. As shown in FIG. 1, a case is considered in which a ray R003 radiated from a transmission point S001 passes the vicinity of an edge E002 of a structure E001. In this case, a ray spread RS001 is defined for the ray R003 and the ray spread RS001 intersects the edge E002 at an interval E003.

Figure 2:
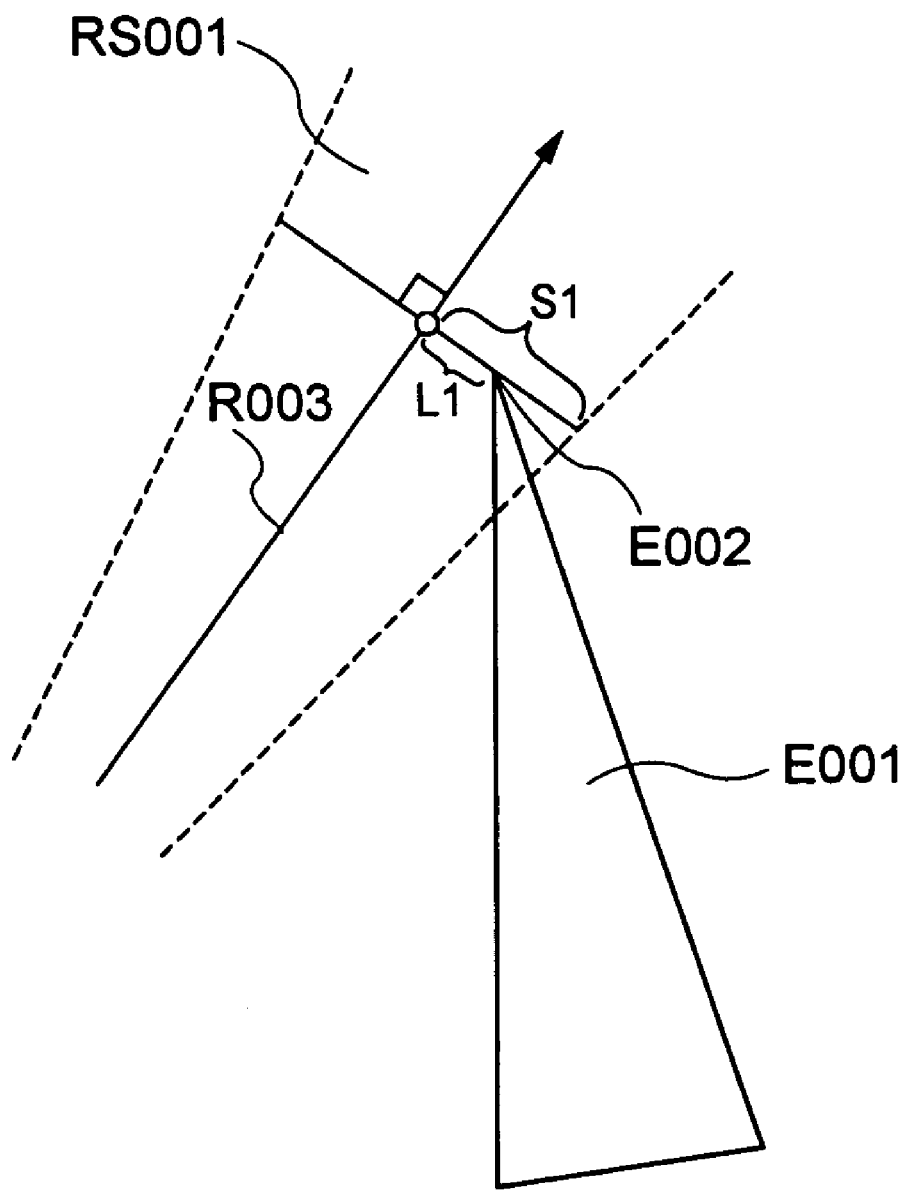
FIG. 2 is an illustration for explaining diffracted ray generation determination in an embodiment of the present invention.

FIG. 2 is an illustration for explaining the intersection determination between the edge E002 and the ray spread RS001, which is a drawing when viewing FIG. 1 from the top. The intersection determination is performed by measuring the vertical distance L1 between the ray R003 and edge E002 and comparing the distance L1 with the spread radius S1 of the ray spread RS001 corresponding to the ray R003 at the spot concerned. That is, when S1 is equal to or larger than L1, diffracted-ray generation is started by determining that they both intersect each other but when S1 is smaller than L1, it is assumed that no diffracted ray is generated.

Figure 3:
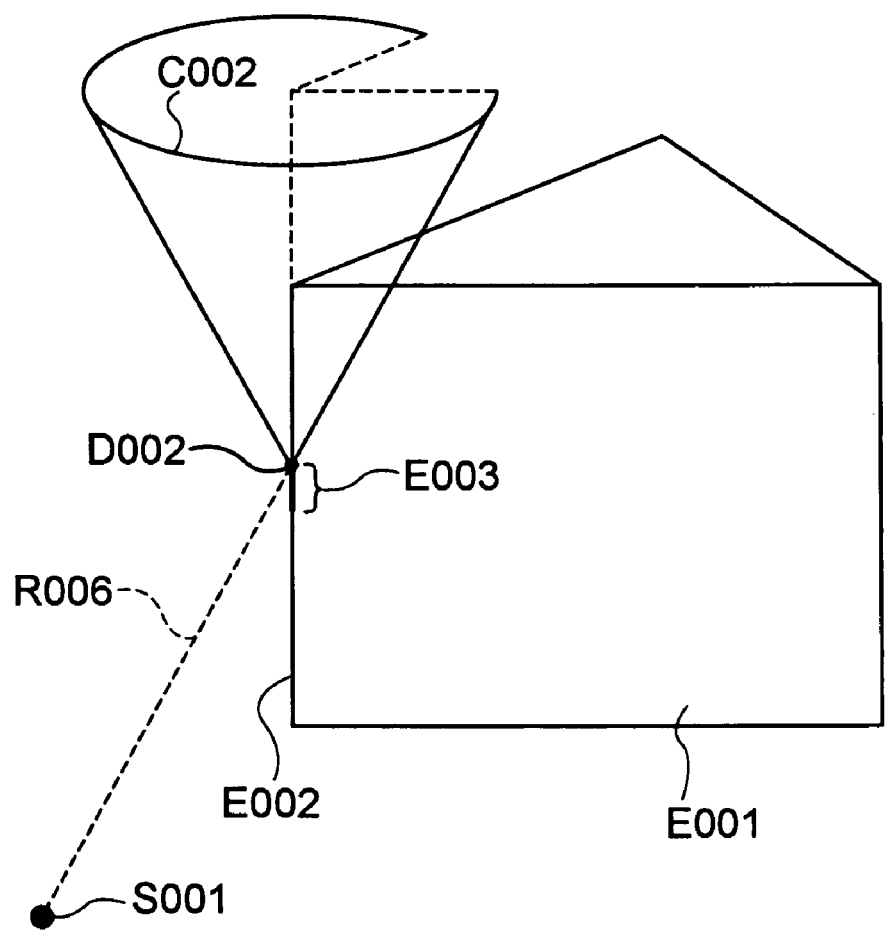
FIG. 3 is an illustration for explaining a diffraction cone in a first embodiment of the present invention.

FIGS. 3 to 6 are illustrations for explaining the diffracted-ray generation according to an embodiment of the present invention. As shown in FIG. 3, in the case of the diffracted-ray generation, a diffraction cone C002 is obtained in accordance with the conventional UTD method by assuming an incident ray enters the edge E002 along a route R006 connecting an end point D002 of the intersecting interval E003 detected on the edge E002 with the transmission point S001.

Figure 4:
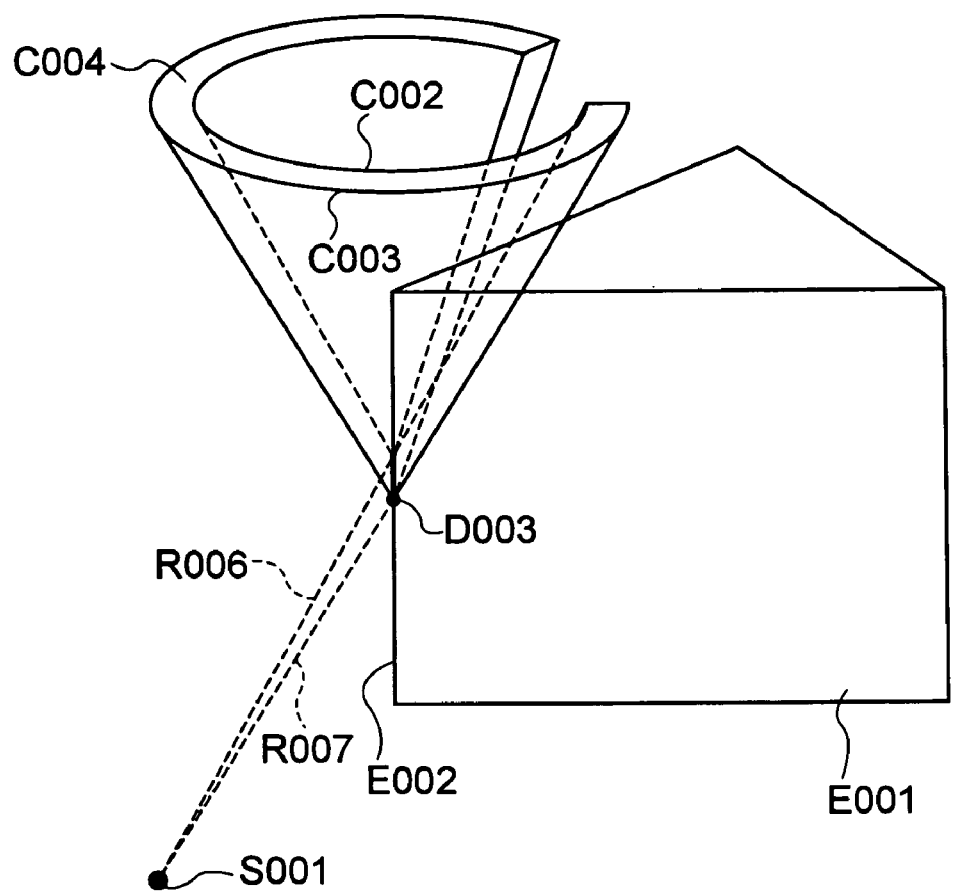
FIG. 4 is an illustration for explaining a diffraction cone in the first embodiment of the present invention.

Then, as shown in FIG. 4, a diffraction cone C003 is obtained for another end point D003 of the intersecting interval E003. Thus, by obtaining two diffraction cones C002 and C003, a region C004 formed between the diffraction cones C002 and C003 is decided. In the case of this embodiment, it is estimated that the intersecting interval E003 obtained under the state shown in FIG. 2 is constituted when innumerable diffraction points are gathered. In this case, diffracted rays generated by all rays entering the edge E002 along all routes connecting the transmission point S001 with all points on the intersecting interval E003, pass through the region C004 shown in FIG. 4. That is, in the case of this embodiment, it is considered that the region C004 is equivalent with an aggregate of innumerable diffracted rays using points on the interval E003 as diffraction points.

Figure 5:
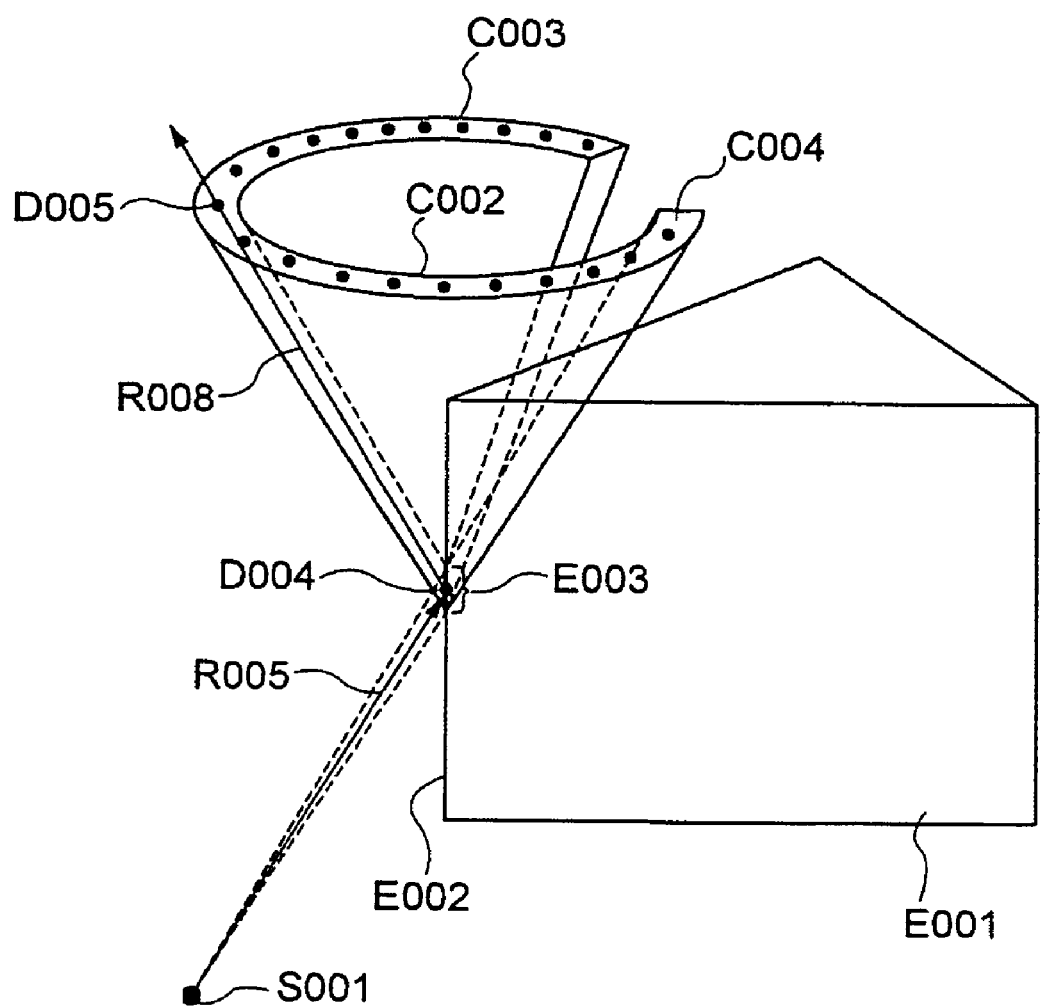
FIG. 5 is an illustration for explaining an arrangement of diffracted-ray passing points in the first embodiment of the present invention.

FIG. 5 is an illustration for explaining a diffracted-ray allocating method of this embodiment. In the case of this embodiment, it is considered to divide the region C004 into a plurality of partial regions and allocate diffracted rays to the partial regions one each in order to approach the aggregate of diffracted rays shown by the region C004 in accordance with the ray launching method. First, points D005 are arranged on the horizontal cross section of the region C004 at equal or unequal intervals and then a point D004 is provided on the interval E003. In the case of this embodiment, it is assumed that a diffracted ray such as R008 propagates on a route connecting the point D004 serving as a diffraction point with each point on the cross section of the region C004. In this case, an incident ray serving as the diffracted ray is assumed as a ray R005 which propagates on a route connecting the transmission point S001 with the diffraction point D004.

Figure 6:
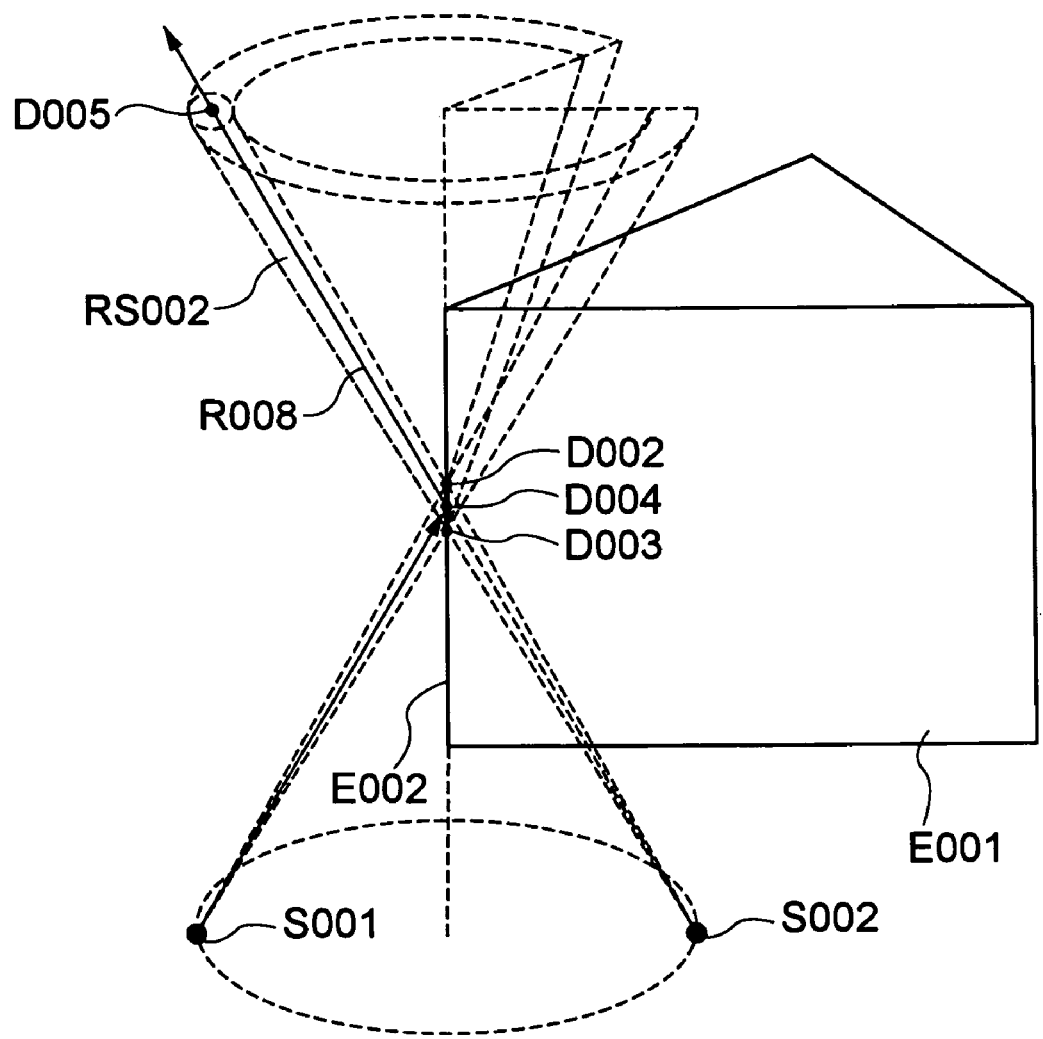
FIG. 6 is an illustration for explaining a method for generating a diffracted ray in the first embodiment of the present invention.

FIG. 6 is an illustration for explaining a method for defining a ray spread RS002 when regarding the diffracted ray R008 as a ray according to the ray launching method. In this case, a case is described below in which the ray spread RS002 is defined by a cone using the ray R008 as a central axis. As shown in FIG. 6, it is assumed that the ray spread RS002 corresponding to the diffracted ray R008 is a conical ray spread corresponding to a ray radiated from a dummy transmission point S002. In this case, the dummy transmission point S002 is located at a place where a straight line D005-D004 is extended by a length equal to the length of a segment S001-D004 from the point D004 to the opposite side to the point D005. Moreover, it is assumed that the apex angle of a cone forming the ray spread RS002 is equal to the angle formed between a side S002-D003 and a side S002-D002.

By executing the above processing for each point same as D005 shown in FIG. 5, the region C004 is approximately subdivided by the ray spread defined by each diffracted ray. This embodiment uses a conical ray spread as an example. However, it is preferable to define the shape of a ray spread so that a region when synthesizing ray spreads possibly coincides with the region C004 without duplication. Thus, an intersecting segment between a ray spread and an edge is assumed as an aggregate of diffraction points, a predetermined number of diffracted rays is allocated into an aggregate region of diffracted rays generated as wave sources, and moreover a ray spread is allocated to these diffracted rays.

Then, the propagation-route tracing operation using a diffracted-wave generating method of the present invention is described below by referring to FIG. 7. In the case of the example in FIG. 7, route tracing is considered when radiating rays from a transmission point B18 in a space in which structures B05, B06, B08, B09, and B13 are arranged.

A ray B03 radiated from the transmission point B18 collides with the structure B06 at a reflection point B19 and reflection and transmission occur at this point. A transmitting ray is radiated at the route shown by B07 and moreover, subsequent route tracing is continued until a predetermined end condition is satisfied. In this case, description is progressed by noticing a reflected ray B11. The reflected ray B11 generated at the reflection point B19 further reaches the structure B09 and a transmitted ray B15 and reflected ray B10 are generated at a reflection point B20. For these transmitted ray and reflected ray, route tracing is similarly performed subsequently until a predetermined end condition is satisfied.

Figure 7:
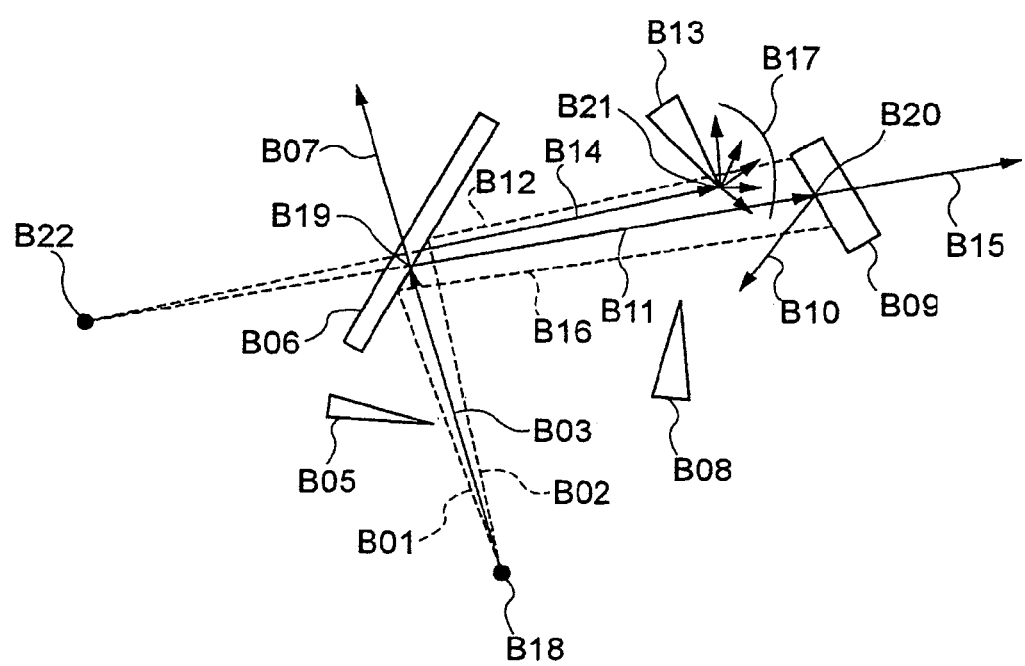
FIG. 7 is an illustration for explaining route tracing in the first embodiment of the present invention.

According to the present invention, however, in the case of the example in FIG. 7, a diffracted ray is further generated by the ray B11. B01 and B02, and B12 and B16 are envelops of ray spreads corresponding to the rays B03 and B11. In the case of the example in FIG. 7, because the distance between edges of the ray B11 and structure B13 is smaller than the ray spread, diffracted rays which use the diffraction point B21 on an edge of the structure B13 as a starting point, are generated. However, in the case of this example, the ray B11 is not a ray immediately after radiated from a transmission point. Therefore, the above embodiment relating to generation of diffracted rays is applied by assuming that a point B22 progressed reversely to the traveling direction of the ray B11 by the propagation distance between the transmission point B18 and the starting point B19 from the reflection point B19 serving as the starting point of the ray B11 as a dummy transmission point and the ray B11 is radiated from the dummy transmission point B22.

Though the starting point serves as a reflection point in this case, an embodiment of the present invention is also applied to a case in which the starting point is a transmission point or diffraction point by setting a dummy transmission point.

When conforming to the above embodiment, a ray entering the diffraction point B21 is B14 but a plurality of diffracted rays B17 is generated. Regarding these diffracted rays, route tracing is continued until a predetermined end condition is satisfied. Thus, by considering reflection, transmission, and diffraction and thereby performing route tracing, a final estimated result of a radio-wave propagation characteristic at a reception point is obtained.

As described above, by using the method according to this embodiment considering the spread of a ray, a diffracted ray is generated even in the case of the ray launching method when a diffracted ray is generated by combining the imaging method with the UTD method. Moreover, the present invention has an advantage that the propagation tracing of a diffracted ray radiated from a diffraction point can be handled similarly to the tracing by the normal lay launching method. That is, because the range of determining whether a ray radiated from a dummy transmission point collides with a structure and performing the reception determination with an observation point by using the ray spread defined for a diffracted ray is maintained, it is easy to estimate a diffraction phenomenon by combining the normal launching method with the conventional launching method.

As described above, the present invention makes it possible to easily combine the high-speed processibility of the ray launching method with a high-accuracy diffraction evaluating function by the UTD method and provide a high-accuracy radio-wave propagation forecasting function.

Then, a second embodiment of the present invention is described below by referring to the accompanying drawings. The above first embodiment employs a method for arranging points at equal or unequal intervals on the cross section of the region C004 defined by two diffraction cones C002 and C003 upon generating a diffracted ray. However, the second embodiment employs a method for generating a diffracted ray by using a virtual reflection plane.

Figure 8:
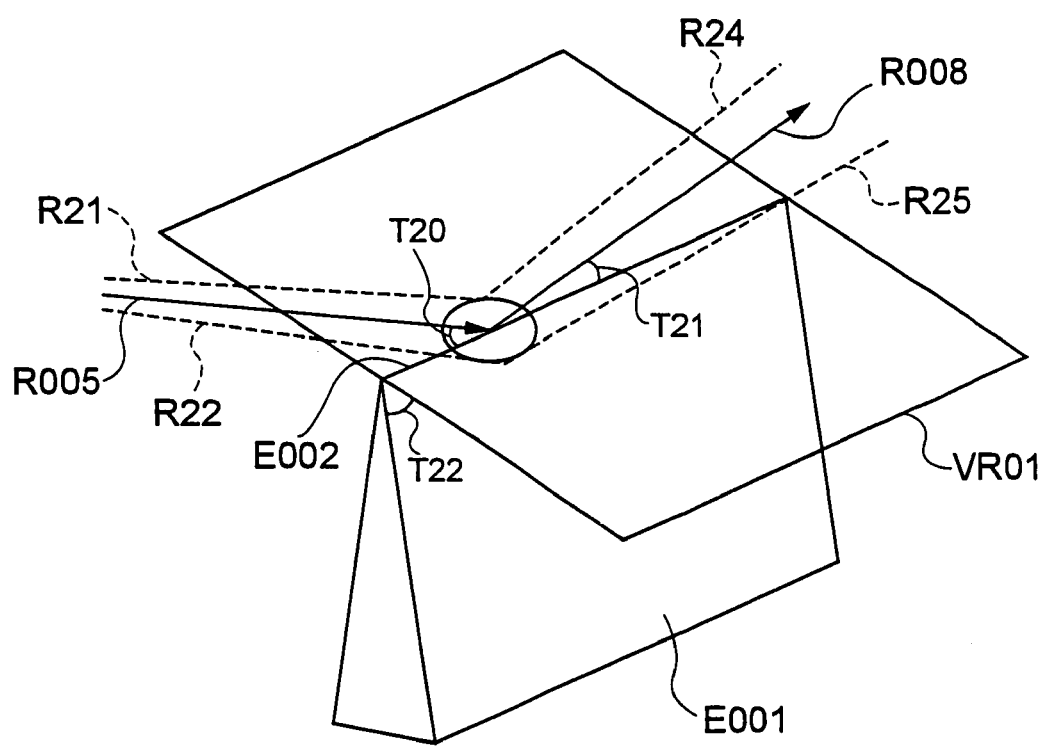
FIG. 8 is an illustration for explaining a method for generating a diffracted ray in a second embodiment of the present invention.
Figure 9:
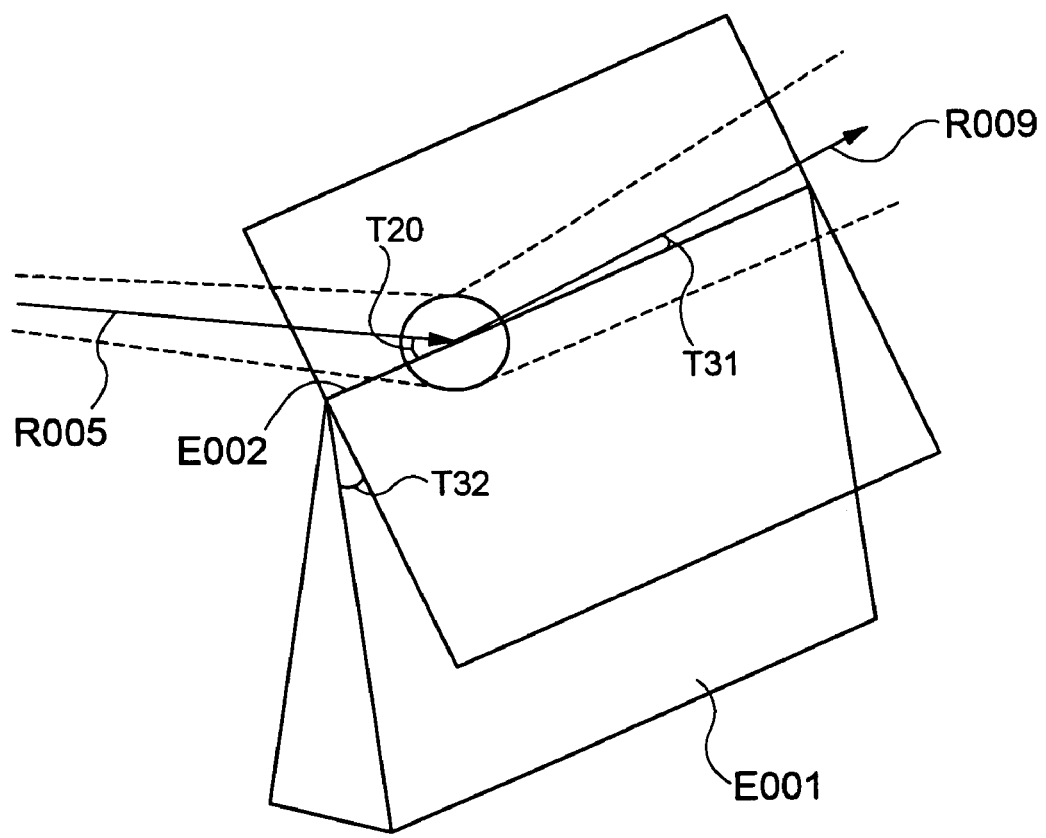
FIG. 9 is an illustration for explaining a method for generating a diffracted ray in the second embodiment of the present invention.

FIGS. 8 and 9 are illustrations for explaining a method for generating a diffracted ray and the envelope of a ray spread (hereafter referred to as ray-spread envelope). FIG. 8 shows a state in which an incident ray R005 and parts of envelope R21 and R22 of ray spread envelopes to the incident ray R005 enter a diffraction edge E002 of a structure E001 by assuming a conical ray spread.

In this case, a reflected ray and a reflected ray-spread envelop are generated by forming a virtual reflection plane VR01 having an angle T22 from a structure E001 so as to contact with the diffraction edge E002 and assuming that a ray R005 and the ray-spread envelopes R21 and R22 enter the virtual plane. In this case, the angle T20 formed between an incident ray and the virtual reflection plane VR01 is equal to the angle T21 formed between a reflected ray R008 and the virtual reflection plane VR01. Because the virtual reflection plane VR01 includes the diffraction edge E002, the formed angles T20 and T21 are equal to the angle formed between the incident ray and the reflected ray and the angle formed between the reflected ray and the diffraction edge respectively.

Therefore, when comparing the above method with the conventional UTD method, the reflected ray generated by the method and the reflected-ray spread envelope correspond to a refracted ray to the angle T22 and a ray spread envelope to the diffracted ray. FIG. 9 shows only a small number of ray spread envelopes. However, innumerable ray spread envelopes are defined so as to surround the incident ray R005 and the diffracted ray R009 of the incident ray R005.

A diffracted ray and a ray spread envelope are generated also for other angles by changing the angle formed between a diffraction edge and a virtual reflection plane. FIG. 9 shows some of diffracted rays and some of ray spread envelopes when making the angle T32 smaller than the angle T22 formed between the diffraction edge and the virtual reflection plane defined in FIG. 8. Also in this case, the angle T20 formed between the incident ray R005 and diffraction edge E002 is equal to the angle T31 formed between the diffracted ray R009 and diffraction edge E002.

Therefore, to generate a diffracted ray, a limited number of diffracted rays are generated by discretely changing an angle formed between a diffraction edge and a virtual reflection plane and at the same time, the ray spread of a diffracted ray is also defined corresponding to the ray spread of an incident ray. In this case, the discrete interval of the angle formed between the diffraction edge and virtual reflection plane is obtained so that the sum region of ray spreads of diffracted rays generated correspondingly to the spread degree of an incident ray spread possibly approaches the region C004 without duplication.

By conforming to the above method, it is possible to realize radio-wave propagation forecast considering a diffracted wave at a high speed and a high accuracy by combining the ray launching method with the UTD method the same as the case of the first embodiment.

Figure 10:
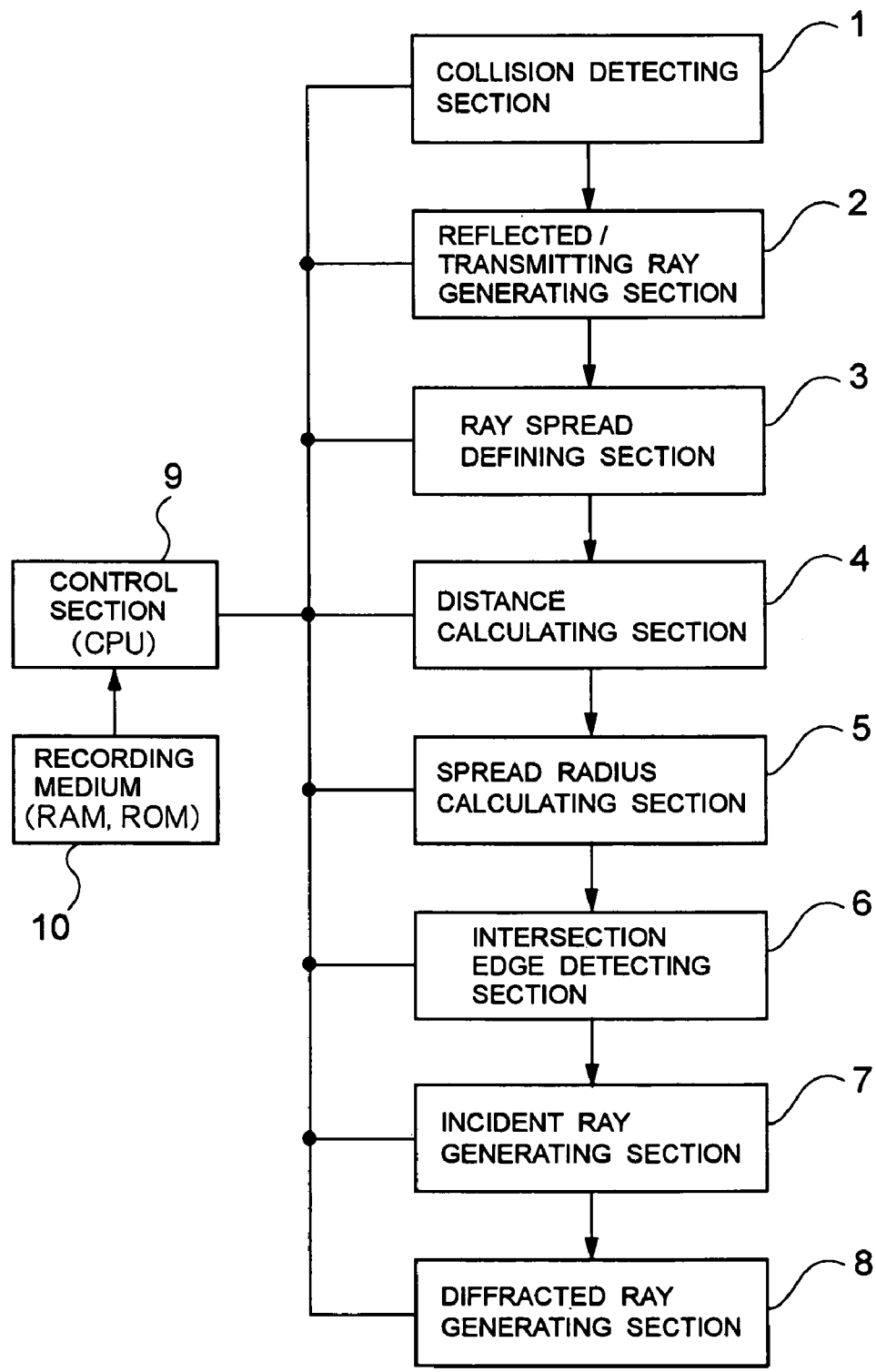
FIG. 10 is a functional block diagram of route tracing in an embodiment of the present invention.

FIG. 10 is an illustration showing functional blocks for realizing processing operations of the above embodiments. In FIG. 10, a collision-point detecting section 1 is a block for a collision point between a ray radiated from a reflection point, transmission point, or diffraction point and a structure set in a propagation environment. A reflected-transmitting-ray generating section 2 is a block for generating a reflected/transmitting ray at a collision point detected by the collision-point detecting section 1. A ray-spread defining section 3 is a block for defining ray spreads of these rays, in which a ray spread is defined as a function of propagation distances from a transmission point for the rays. Each of the above embodiments uses a spread whose radius increases as the distance increases, for example a shape of the spread is conical.

A distance calculating section 4 calculates the distance between a structure and an edge and the spread radius calculating section obtains a point on a ray for deciding a calculated distance by the distance calculating section 4 and a point on an edge to calculate a spread radius to the distance from the point on the ray to a transmission point. An intersection edge detecting section 6 compares the distance between a ray and a structure edge with the radius of a ray spread to determine whether an intersecting region is present between the ray spread and the edge.

An incident ray generating section 7 is a block for calculating a ray entering an edge intersecting with a ray spread when the edge crossing the ray spread is detected by the intersection edge detecting section 6. A diffracted ray generating section 8 is a block for generating a diffracted ray generated when an incident ray calculated by the incident ray generating section 7 enters an intersection edge region detected by the intersection edge detecting section 6. A control section 9 controls these sections 1 to 8, which operates in accordance with the operation procedure of a program stored in a recording medium 10 to control each section and is constituted by a CPU (computer). The recording medium 10 is constituted by a RAM and a ROM, in which the RAM serves as a work memory of the CPU and the ROM stores the program. The operation procedure by each of the above embodiments can be controlled by previously storing the procedure in the ROM as a program.

Figure 11:
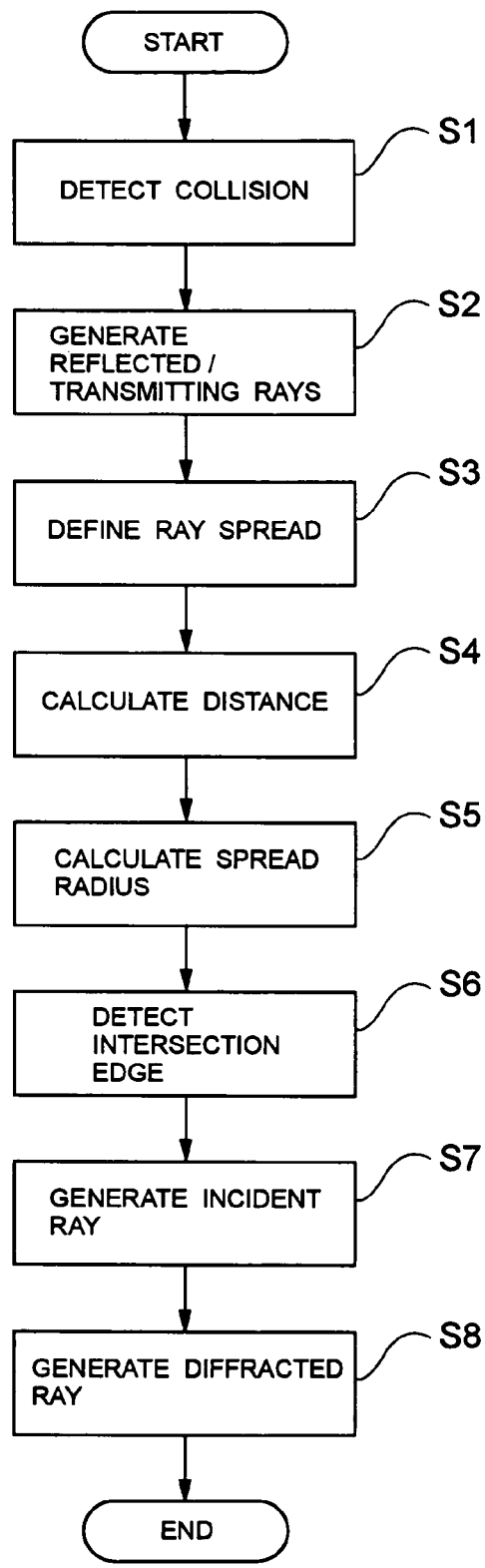
FIG. 11 is a flowchart showing operations in an embodiment of the present invention.

FIG. 11 is a flowchart showing operations of an embodiment of the present invention and the operations are executed in accordance with a processing procedure conforming to operations of the functional blocks in FIG. 10, in which processings of the sections 1 to 8 in FIG. 10 are correspondingly shown as steps S1 to S8.

In an embodiment of the present invention, the route tracing operation according to ray tracing generally has a large load. Therefore, when purposing a complex propagation environment, a lot of calculation time may be required. Moreover, when a large number of diffracted rays are generated by the diffracted-ray generating section 8 in FIG. 10, the time required for the route tracing further increases to increase the whole calculation time.

Figure 12:
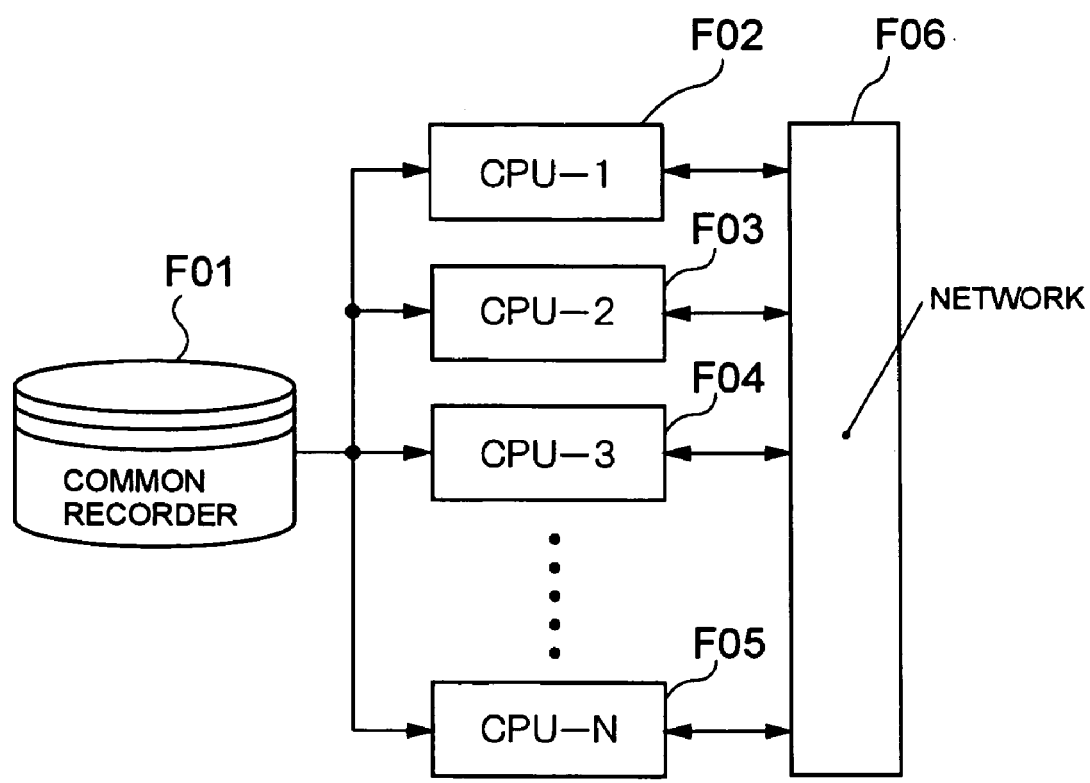
FIG. 12 is a block diagram of a system for executing an embodiment of the present invention by using a plurality of CPUs.

An embodiment of the present invention can be realized also by using a single CPU. However, to accurately analyze a complex propagation environment in a short time, it is effective to execute processings in parallel by using a plurality of CPUs. FIG. 12 is an illustration for explaining a system when realizing an embodiment of the present invention by using a plurality of CPUs. The system is constituted by N central processing units (CPU1 to CPUN) F02 to F05, a common recorder F01, and a network F06 and each CPU can communicate with all other CPUs through the network F06. Data can be read from or written in the common recorder F01 by all CPUs from 1 to N.

The common recorder F01 may be set in any one of CPUs. In this case, CPUs other than the CPU concerned access the common recorder F01 via the network F06. The common recorder F01 may be set on the network F06. The common recorder F01 is used to record a radio-wave propagation characteristic or store an operation program for controlling each CPU.

Figure 13:
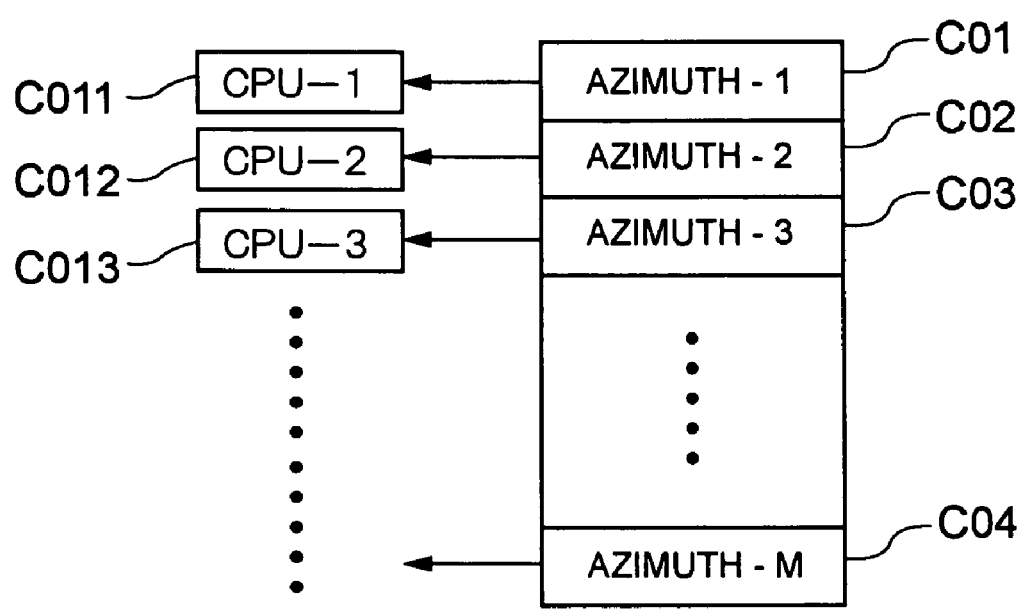
FIG. 13 is an illustration for explaining a method for allocating a process of an embodiment of the present invention to a plurality of CPUs.

FIG. 13 is an illustration for explaining a method for performing distributed processing of route tracing by a plurality of CPUs. Propagation routes of rays connecting transmission points with reception points can be classified every azimuth using a transmission point as a starting point without duplicating each other. Therefore, by allocating the route retrieval every azimuth using a transmission point as a starting point to different CPUs, it is possible to perform all route retrievals in parallel. FIG. 13 is an illustration for explaining the configuration of the parallel distributed processing of ray route tracing by the above method. A state is shown in which route tracings of M azimuths shown by C01 to C04 different from each other are allocated to a plurality of CPUs shown by C11 to C13. According to the above method, it is possible to perform route tracings in parallel and complete operations in a short time.

Figure 14:
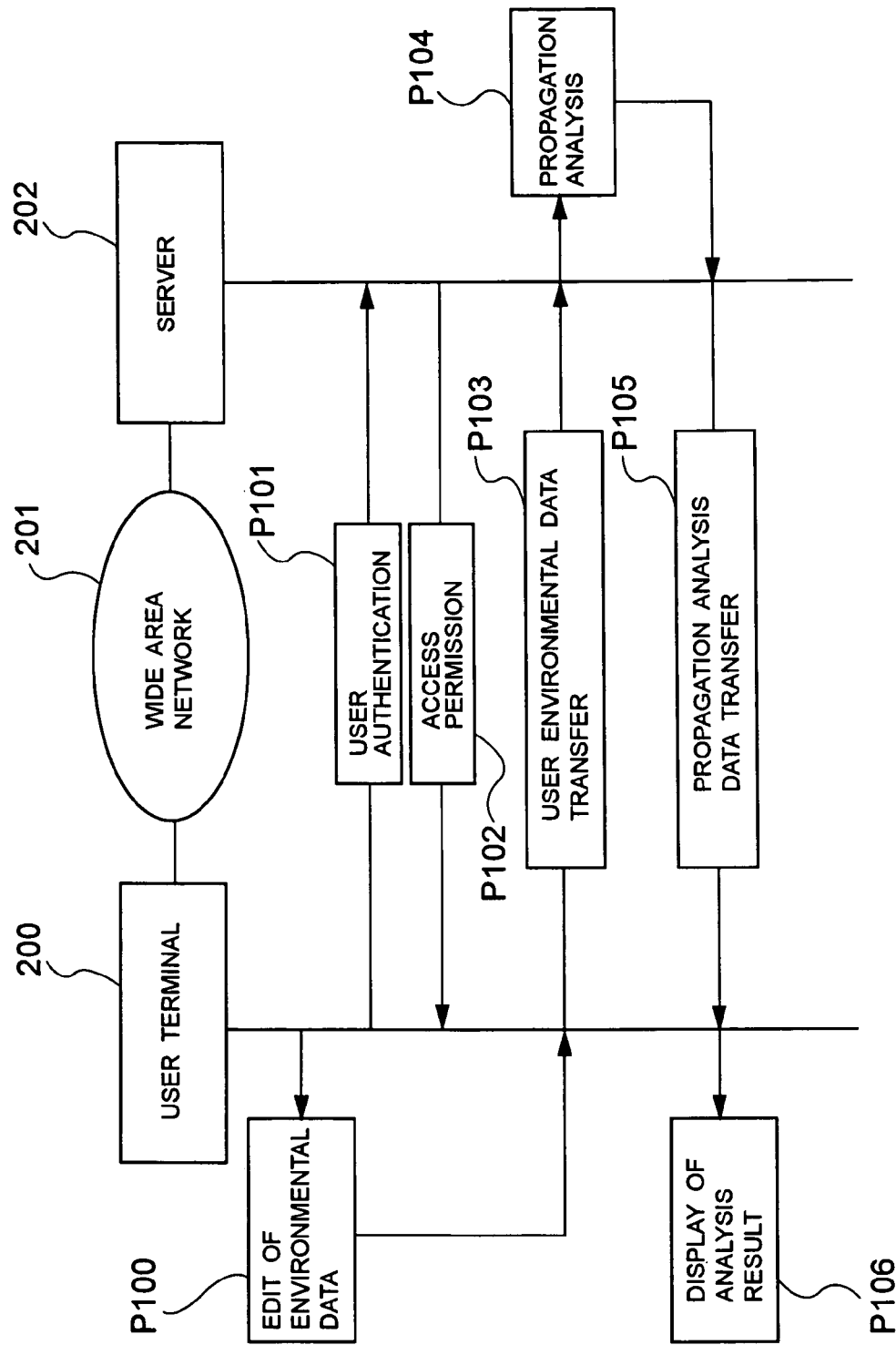
FIG. 14 is a block diagram of a radio-wave propagation forecasting system according to an embodiment of the present invention.
Figure 15:
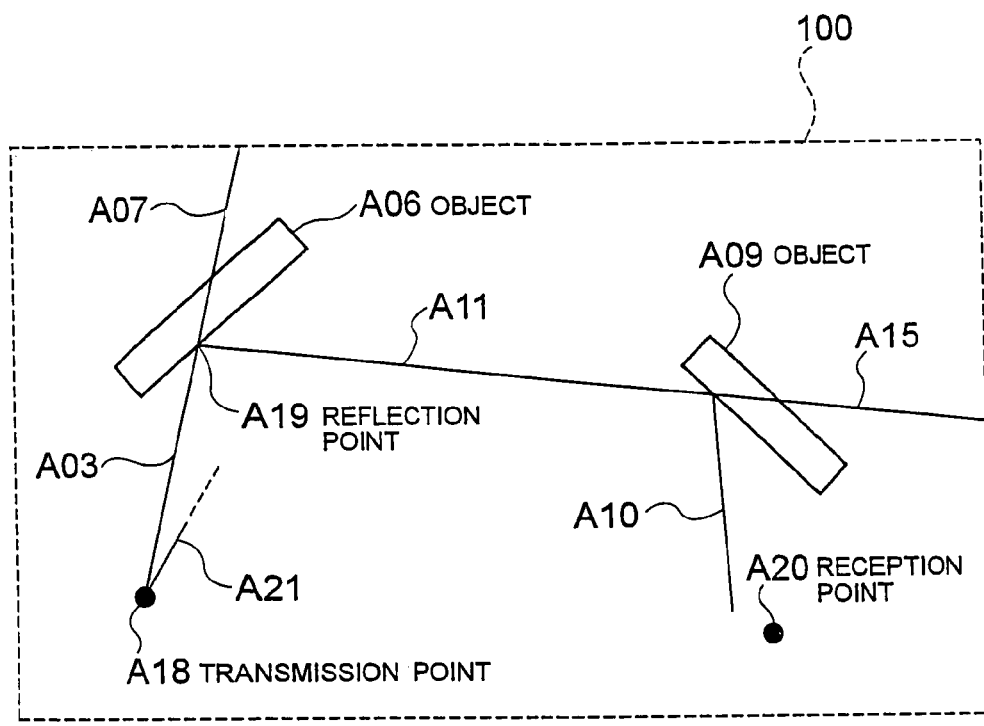
FIG. 15 is an illustration for schematically explaining the ray launching method.
Figure 16:
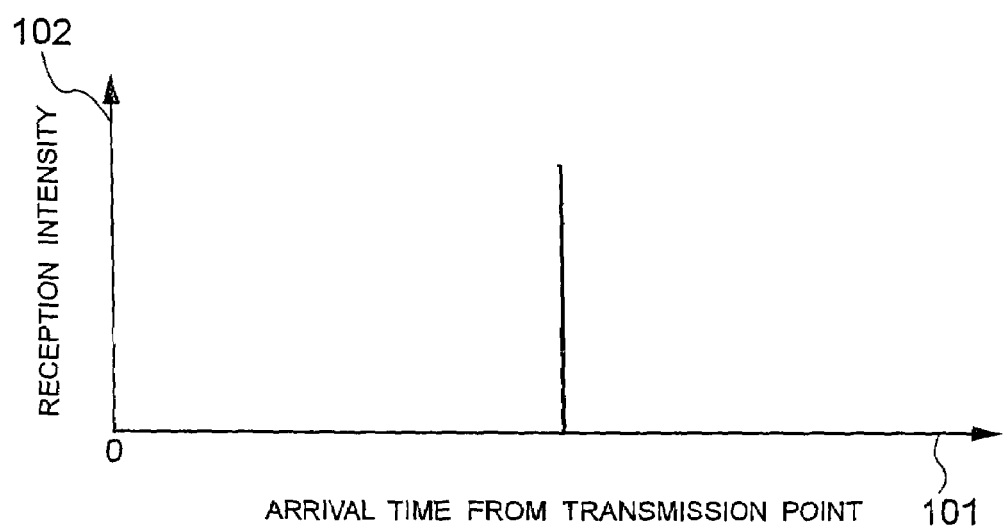
FIG. 16 is an illustration showing a path profile at an observation point to one ray.
Figure 17:
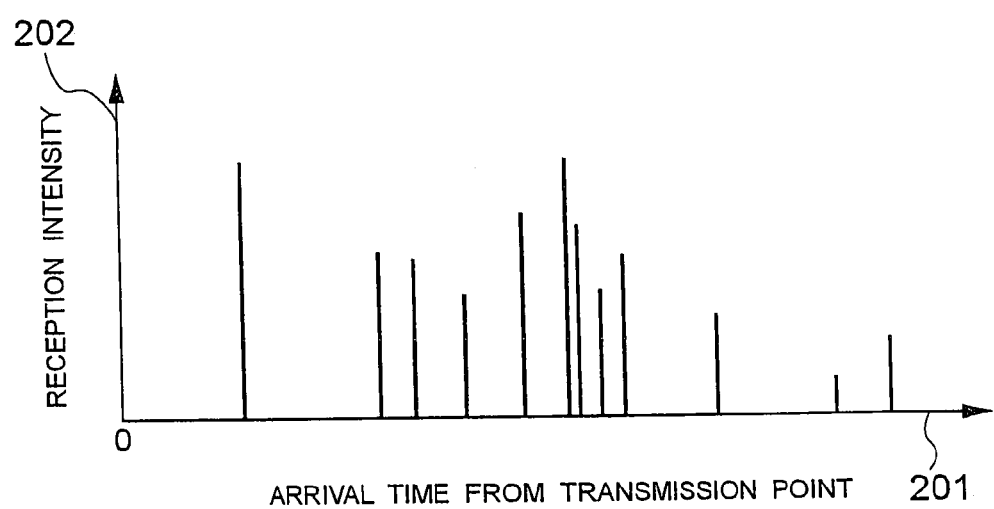
FIG. 17 is an illustration showing a path profile at an observation point obtained from the ray launching method.
Figure 18:
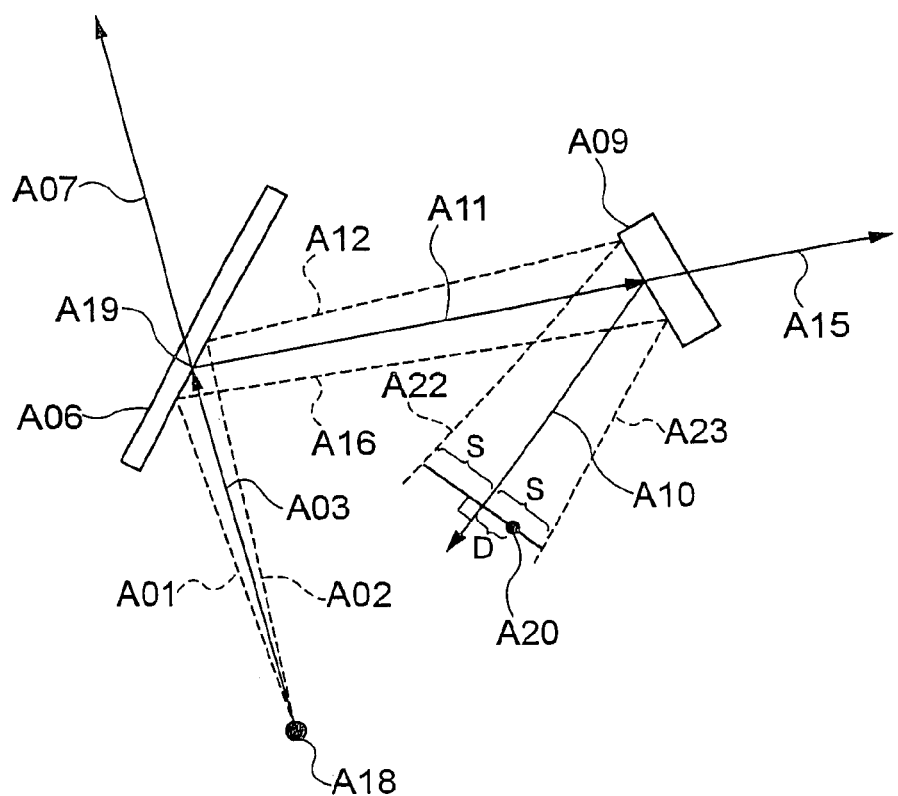
FIG. 18 is another illustration for schematically explaining the ray launching method.
Figure 19:
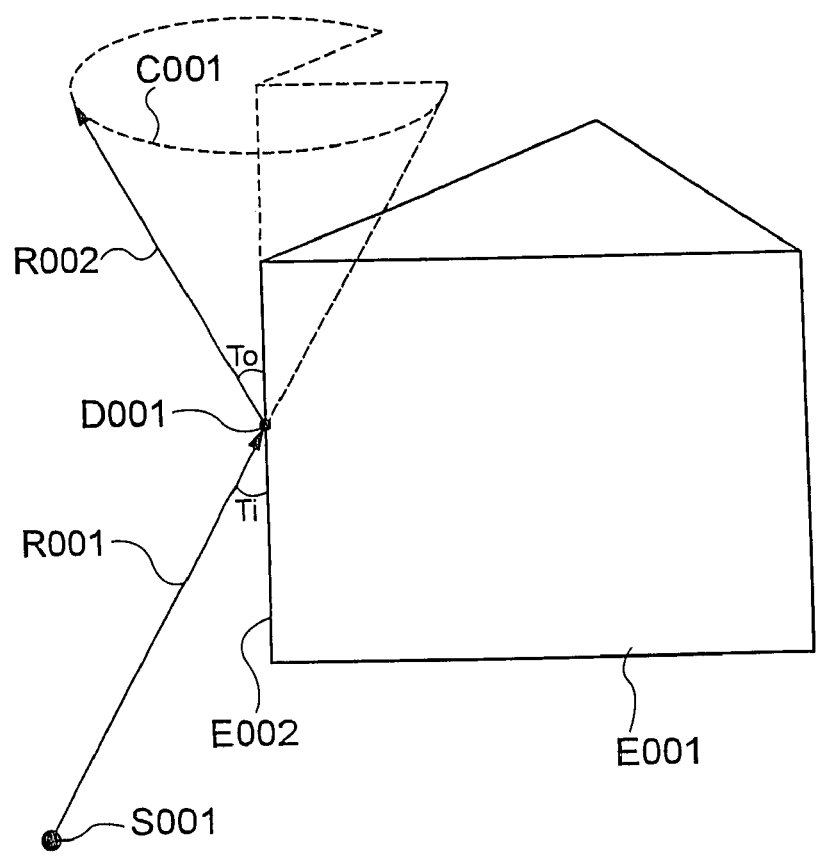
FIG. 19 is an illustration for explaining the UTD (Uniform Theory Diffraction) method.

A propagation analyzing system according to the above embodiment can be also realized by using a stand-alone computer. However, the trend cannot be negated that cost increases when each user constructs the system independently. FIG. 14 is an illustration for explaining a system model in which a propagation analysis part is shared by a plurality of users through a network. In the case of this model, a user terminal 200 accesses a server 202 through a wide area network 201. The sever 200 includes a user authenticating function and a propagation analyzing function and the propagation analyzing system using a single CPU or a plurality of CPUs described for the above embodiment is integrated in this portion.

In the case of the system in FIG. 14, a user first edits environmental data by using an editing client stored in a user terminal (P100). The structural information on a space to be analyzed is described in the environmental data and a propagation analyzing simulator performs ray tracing in accordance with the structural information. Moreover, characteristic information relating to the specification of a radio system to be analyzed may be described in the environmental data. Therefore, it is also possible to dictate the behavior of an engine corresponding to each equipment characteristic to the engine through the environmental data.

Then, user authentication is performed between the user and the server 202 in order to transfer the prepared environmental data to the server (P101) to obtain an access permission (P102). Security protection is applied to the data exchanged between the server and a user terminal by access control by an authentication system and encryption of a communication route so that the contents of environmental data and analysis data are not leaked to the third party other than the user.

After the authentication is completed, the environmental data of the user is transferred to the server (P103) and the server performs propagation analysis in accordance with the received environmental data (P104). When the analysis is completed, an analysis result is transferred to a terminal of the user (P105) and the user displays the analysis result on the terminal (P106).

As described above, according to the above method, by integrating and sharing a high-cost apparatus such as a propagation analyzing simulator, it is possible to decrease the analysis cost. Moreover, because it is possible to uniquely control the central portion of a system, there is an advantage that maintenance is simplified.

As described above, according to the present invention, advantages are obtained that in estimating a radio-wave propagation characteristic when a ray passes the vicinity of an edge of a structure, if the distance between the edge and ray is smaller than the radius of the ray spread, a diffracted wave is generated at the edge, and thus it is easy to combine the ray launching method with the conventional one and it is possible to quickly and accurately forecast a radio-wave propagation characteristic considering even a diffracted wave of a ray.

What is claimed is:

1. A radio-wave propagation characteristic forecasting system for performing ray launching for obtaining a passage time and an intensity when a structure having an edge, a transmission point, and a reception point are provided in an observation space defined in a three-dimensional space, a plurality of radio-wave rays is radiated from the transmission point at different angles, and the rays repeat reflection and transmission due to collision with the structure caused by their progress and pass the vicinity of the reception point while repeating the reflection and transmission; comprising:
   ray spread defining means for defining a ray spread provided as a function of propagation distances from the transmission point to the rays;
   distance calculating means for calculating the distance between each of the rays and the edge;
   radius calculating means for obtaining a point on each of the rays and a point on an edge for deciding the distance and calculating a ray spread radius to the distance from the point on each of the rays up to the transmission point; and
   diffracted-ray generating means for generating a plurality of diffracted rays by using the point on the edge as a diffraction point when the ray spread radius is equal to or larger than the distance between each of the rays and the edge.

2. The radio-wave propagation characteristic forecasting system according to claim 1, wherein
   the ray spread defining means is defined as a function in which the radius of the ray spread increases as the propagation distance of each of the rays from the transmission point increases.

3. The radio-wave propagation characteristic forecasting system according to claim 1, wherein
   the diffracted-ray generating means uses the line connecting the diffraction point with the transmission point, or a line connecting the diffraction point with a dummy transmission point obtained from a reflection point, transmission point, and diffraction point which are the closest to the rays as an incoming ray for generating the diffracted rays.

4. The radio-wave propagation characteristic forecasting system according to claim 3, wherein
   the diffracted-ray generating means assumes a plurality of virtual planes contacting with the edge, generates reflected waves respectively using the incoming ray as an incoming wave on each virtual plane, and uses these reflected waves as diffracted rays.

5. The radio-wave propagation characteristic forecasting system according to claim 1, wherein
   the diffracted-ray generating means uses a crossing segment between the ray spread and the edge as an aggregate of diffraction points, assigns a predetermined number of diffracted rays in the collective region of diffracted rays generated by using the aggregate of the diffraction points as a wave source, and moreover assigns the ray spread to each diffracted ray.

6. The radio-wave propagation characteristic forecasting system according to claim 1, wherein
   the means are executed in parallel every azimuth of a ray using the transmission point as a starting point.

7. A radio-wave propagation characteristic forecasting method for performing ray launching for obtaining a passage time and an intensity when a structure having an edge, a transmission point, and a reception point are provided in an observation space defined in a three-dimensional space, a plurality of radio-wave rays is radiated from the transmission point at different angles, and the rays repeat reflection and transmission due to collision with the structure caused by their progress and pass the vicinity of the reception point while repeating the reflection and transmission; comprising:
   a ray spread defining step of defining a ray spread provided as a function of propagation distances from the transmission point to the rays;
   a distance calculating step of calculating the distance between each of the rays and the edge;
   a radius calculating step of obtaining a point on each of the rays and a point on the edge for determining the distance and calculating a ray spread radius to the distance from the point on each of the rays up to the transmission point; and
   a diffracted-ray generating step of generating a plurality of diffracted rays by using the point on the edge as a diffraction point when the ray spread radius is equal to or larger than the distance between each of the rays and the edge.

8. The radio-wave propagation characteristic forecasting method according to claim 7, wherein
   the ray spread defining step is defined as a function in which the radius of the ray spread increases as the propagation distance of each of the rays from the transmission point increases.

9. The radio-wave propagation characteristic forecasting method according to claim 7, wherein
   the diffracted-ray generating step uses the line connecting the diffraction point with the transmission point, or a line connecting the diffraction point with a dummy transmission point obtained from a reflection point, transmission point, and diffraction point which are the closest to the rays as an incoming ray for generating the diffracted rays.

10. The radio-wave propagation characteristic forecasting method according to claim 9, wherein
    the diffracted-ray generating step assumes a plurality of virtual planes contacting with the edge, generates reflected waves respectively using the incoming ray as an incoming wave on each virtual plane, and uses these reflected waves as diffracted rays.

11. The radio-wave propagation characteristic forecasting method according to claim 7, wherein the diffracted-ray generating step uses a crossing segment between the ray spread and the edge as an aggregate of diffraction points, assigns a predetermined number of diffracted rays in the collective region of diffracted rays generated by using the aggregate of the diffraction points as a wave source, and moreover assigns the ray spread to each diffracted ray.

12. The radio-wave propagation characteristic forecasting method according to claim 7, wherein the steps are executed in parallel every azimuth of a ray using the transmission point as a starting point.

13. A computer-readable medium encoded with a computer program for making a computer execute a radio-wave propagation characteristic forecasting method for performing ray launching for obtaining a passage time and an intensity when a structure having an edge, a transmission point, and a reception point are provided in an observation space defined in a three-dimensional space, a plurality of radio-wave rays is radiated from the transmission point at different angles, and the rays repeat reflection and transmission due to collision with the structure caused by their progress and pass the vicinity of the reception point while repeating the reflection and transmission; comprising:

a ray spread defining step of defining a ray spread provided as a function of propagation distances from the transmission point to the rays;

a distance calculating step of calculating the distance between each of the rays and the edge;

a radius calculating step of obtaining a point on each of the rays and a point on the edge for determining the distance and calculating a ray spread radius to the distance from the point on each of the rays up to the transmission point; and a diffracted-ray generating step of generating a plurality of diffracted rays by using the point on the edge as a diffraction point when the my spread radius is equal to or larger than the distance between each of the rays and the edge.

* * * * *